US007174822B2

(12) United States Patent
Friel, Sr.

(10) Patent No.: US 7,174,822 B2
(45) Date of Patent: Feb. 13, 2007

(54) EFFICIENT FOOD SLICER

(75) Inventor: Daniel D. Friel, Sr., Greenville, DE (US)

(73) Assignee: Edgecraft Corporation, Avondale, PA (US)

(*) Notice: Subject to any disclaimer, the term of this patent is extended or adjusted under 35 U.S.C. 154(b) by 14 days.

(21) Appl. No.: 10/979,893

(22) Filed: Nov. 2, 2004

(65) Prior Publication Data

US 2005/0152795 A1 Jul. 14, 2005

Related U.S. Application Data

(60) Provisional application No. 60/536,084, filed on Jan. 13, 2004.

(51) Int. Cl.
*B27B 5/02* (2006.01)
*H02K 5/24* (2006.01)

(52) U.S. Cl. ............................ 83/707; 83/167; 83/469; 83/730; 310/52; 310/62; 417/423.1; 30/388

(58) Field of Classification Search .................. 83/707, 83/478, 571, 729, 730, 859, 167, 100, 700; 30/122, 388; 310/52, 58, 56, 62, 88, 51; 417/423.1, 423.8; D7/383, 376
See application file for complete search history.

(56) References Cited

U.S. PATENT DOCUMENTS

| | | | | |
|---|---|---|---|---|
| 1,702,059 | A * | 2/1929 | Schneider et al. | 144/2.1 |
| 2,639,737 | A * | 5/1953 | Forsberg | 30/392 |
| 2,789,238 | A * | 4/1957 | Staak | 310/88 |
| 2,989,995 | A * | 6/1961 | Happe | 30/391 |
| 3,085,603 | A * | 4/1963 | Stanley | 30/392 |
| 3,873,862 | A | 3/1975 | Butler et al. | |
| 4,246,821 | A | 1/1981 | Fuse et al. | |
| 4,273,013 | A | 6/1981 | Artin et al. | |
| 4,414,743 | A * | 11/1983 | Pioch et al. | 30/124 |
| 5,273,358 | A * | 12/1993 | Byrne et al. | 366/205 |
| 5,634,274 | A | 6/1997 | Ohkouchi et al. | |
| 6,043,575 | A * | 3/2000 | Ghode et al. | 310/52 |
| 6,069,423 | A * | 5/2000 | Miller et al. | 310/51 |
| 6,680,551 | B2 * | 1/2004 | Bates et al. | 310/62 |

FOREIGN PATENT DOCUMENTS

| | | |
|---|---|---|
| DE | 1778553 | 12/1971 |
| DE | 10358674 | 7/2005 |
| JP | 2002066986 | 3/2002 |

* cited by examiner

*Primary Examiner*—Boyer D. Ashley
*Assistant Examiner*—Ghassem Alie
(74) *Attorney, Agent, or Firm*—Connolly, Bove, Lodge & Hutz LLP

(57) ABSTRACT

A food slicer comprises a fan-cooled electrically powered motor driving a slicer blade. The motor is mounted within an enclosure which comprises at least one air intake port and at least one exhaust port on opposite sides of one nominally air-tight first partitioning wall within the enclosure to confine the flow of cooling air from the air intake port through the enclosure, then into intimate contact with the electrical windings and components within the frame of the motor. The motor frame is sealed into a closely conforming contacting aperture in the first partitioning wall. The fan is mounted immediately adjacent to a non-contacting aperture in a second partitioning wall within the enclosure juxtaposed the exhaust port.

12 Claims, 6 Drawing Sheets

2
11
10
10
3
5a
5a
6
39
9
8
1
7
37
12

2
11
10
8
9
15
14
6
39
18
3
17
5
20
19
13

EFFICIENT FOOD SLICER

CROSS-REFERENCE TO RELATED APPLICATION

This application is based on provisional application Ser. No. 60/536,084, filed Jan. 13, 2004.

BACKGROUND OF INVENTION

The quantity of food that an electric food slicer can process in a given period of time is limited by the inherent power of its motor and the cooling system for that motor. Conventionally, electric motors in food slicers are cooled by air circulated around the exterior of the motor frame of a fan mounted on the motor shaft. The conventional means of circulating air over the motor frame within the limited enclosure around the motor and its drive train is to mount the motor vertically with air circulated upwardly by the fan. The air heated by the motor is largely recirculated within the enclosure by the fan and partially by convective forces. Only a small portion of the circulated heated air is exhausted out a vent near the top of the slicer.

The ability of low cost electric food slicers to cut foods for an extended time has for these reasons been universally limited by overheating of the electric windings in the motor. The problem is so severe that many manufacturers commonly rate their slicers according to the allowable "continuous operating time", or they provide power switches with only a "momentary ON" position, thus prohibiting continuous operation.

SUMMARY OF INVENTION

The counter intuitive and novel means of cooling a slicer motor described here provides highly efficient cooling and makes it possible, in a given time, to slice increased amounts of food with a given motor or to use smaller motors that consume less electric power to slice a given quantity of food in a specified time. This new means reduces the average temperature of the motor electrical windings and lowers the temperature of the drive gears (usually plastic) allowing them to handle greater torque loadings, to reduce wear or destruction of the gears and thus to increase their useful lifetime. In general this improved means permits continuous slicing operations with inexpensive motors that previously limited operating times to the order of 10 minutes.

In order to offer commercially an inexpensive electric slicer for the home market it is important to reduce the overall size of the slicer itself to a minimum and to use a relatively inexpensive motor. The cost of the motor is a major component in the overall cost of a household electric slicer. In turn, the cost of the motor is a function of its size and power rating. It follows then that anything that will increase the amount of power or work that a motor can deliver is very important to reduce the manufacturing cost of a household slicer. One of the least expensive ways to increase the amount of work (slicing) that a slicer can do, in a given time, would be to improve the cooling of the motor. The amount of power or work that a given motor can deliver is ultimately limited by the maximum temperature that its components can withstand. The motor component that is least able to withstand elevated temperature is the insulation on the electrical wiring within the motor stator or armature windings. This insulation commonly is a very thin film of "varnish". The temperature of the electrical windings rises when the amount of electrical current (amperage) increases in the motor as the slicing load is increased. More effective air cooling of the windings removes heat faster and allows higher current levels to flow through the windings before the windings reach their safe temperature limit which is commonly about 284° Fahrenheit for conventional wire insulations. Consequently, more efficient cooling of the motor's electrical wiring can allow the motor to develop higher torques for a longer period of time and, hence, deliver greater work without overheating the insulation of the electrical conductors that successfully carry the increased current corresponding to the higher torques and work delivered.

THE DRAWINGS

DETAILED DESCRIPTION

This invention provides an inexpensive and highly efficient manner of cooling low cost d.c. or a.c. motors. Conventional low cost motors in slicers use inexpensive and relatively insufficient fans commonly mounted on the upper end of the motor shaft to move air upward around and over the motor housing which is then largely recirculated within the slicer's enclosure for the motor. Only a small fraction of the air exits out of the enclosure through an opening usually at the top of the slicer aided by natural convection effects related to the natural tendency of the hot air to rise upward. The lower density of heated air moves it up against gravity as it is displaced by heavier cooler air adjacent to the rising heated column of air around the exterior of the motor. Because of the aerodynamic inefficiency of conventional inexpensive fans, the axial velocity of air over the motor frame is inadequate to provide effective cooling of the motor.

Optimal cooling of a slicer motor to reduce the temperature of its windings depends on maximizing the velocity of cooler air forced over the internal resistively heated motor windings and internal hotter motor components. The velocity of the air cooling the hot windings and the actual temperature of the air are critically important to achieve optimal cooling of the motor in order to increase the work that can be delivered by the motor over an extended period.

It is essential to recognize that the motors in inexpensive slicers are mounted in a relatively small enclosure with a relatively small volume of air enclosed therein. If the air passing over the motor is not exhausted effectively from the enclosure, it simply recirculates within the enclosure and its temperature increases rapidly. As this happens, that air passing over the motor becomes hotter and hotter and less and less heat is extracted by the heated air passing over the motor frame. The novel solution to this problem disclosed here is to exhaust the heated air efficiently from the environment of the motor and to draw cooler air from the outside into the heated interior of the motor to efficiently remove and promptly exhaust directly the heat being generated in the electrical windings. If the air being passed over the motor is allowed to recirculate and reach the upper temperature limit of the motor insulation, circulation of that air over that insulation, at any velocity, will not reduce the winding temperature below that value. This inventor has found a highly efficient and unique means of exhausting promptly the air heated by such small motors and optimizing the flow of cooler air through the internal motor cavity in direct contact with the windings of the motor stator and armature—all using a single inexpensive fan.

Figure 9:
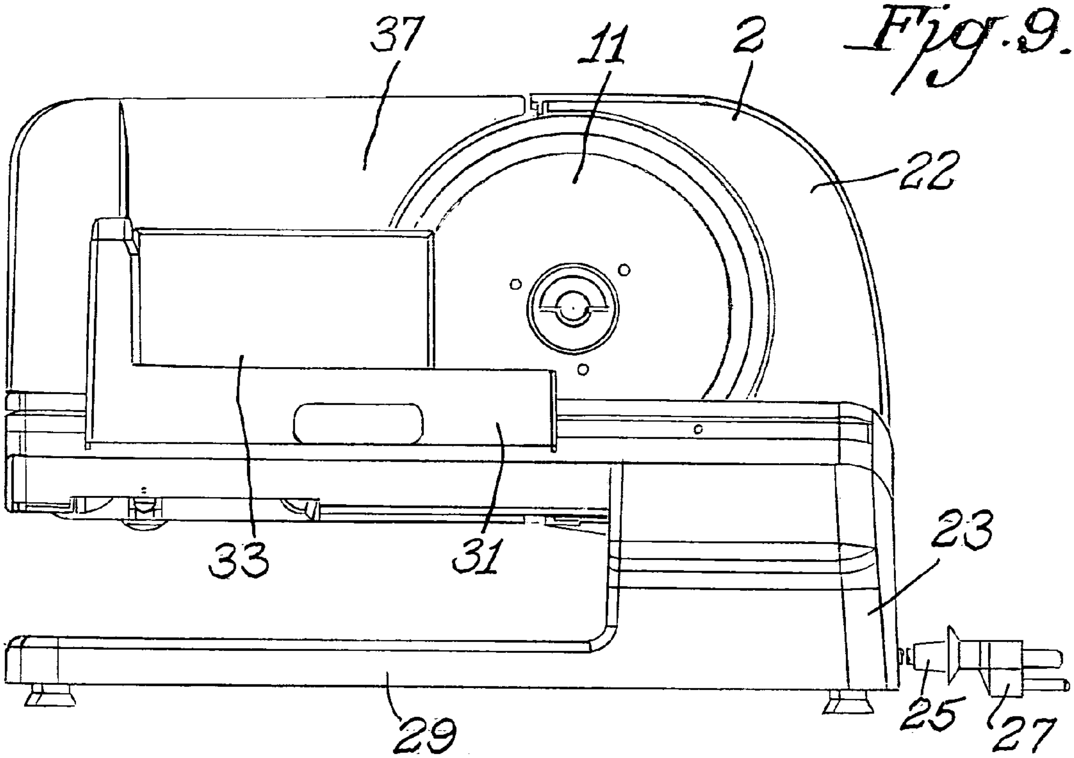
FIGS. 8–10 are side elevational views of an efficient food slicer in accordance with this invention.
Figure 8:
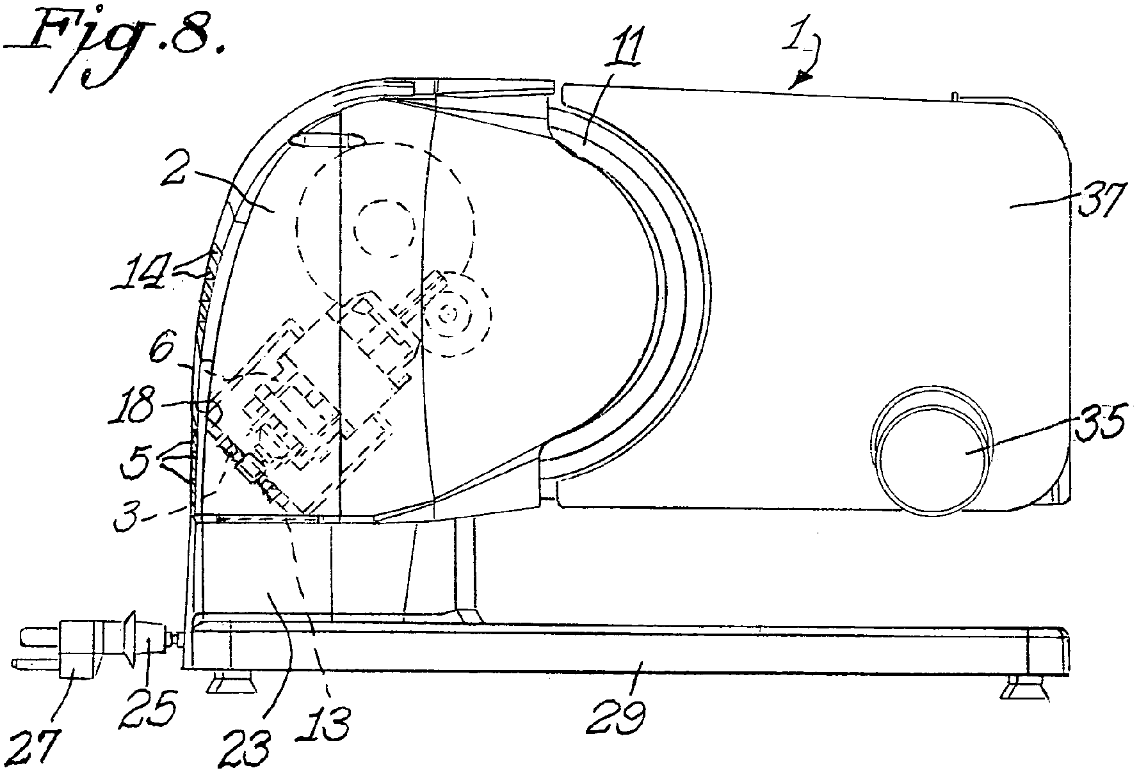
Figure 10:
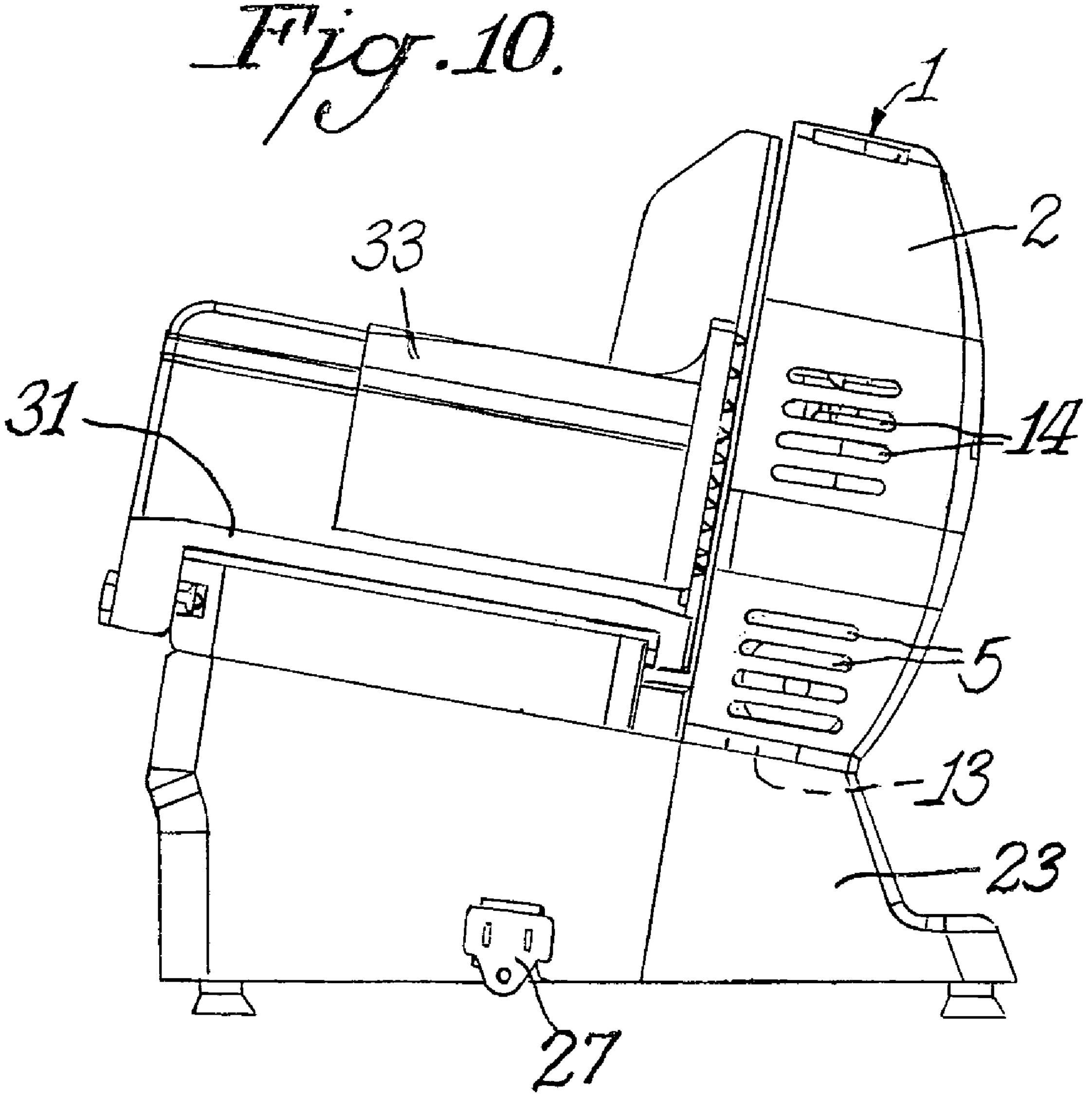

General external views of the food slicer that incorporates the improvements described herein are shown in FIGS. 8, 9 and 10. These are elevation views of the slicer 1 with a power driven slicer blade 11 mounted on the exterior of a motor enclosure 2 made of either plastic or a cast metal such as aluminum. The enclosure 2 also houses the power drive gears to rotate the slicer blade. The end of enclosure 2 is seen in FIG. 10 with portal intake vents 14 for intake of cooling air and portal exhaust vents 5 through which cooling air can exit. The enclosure 2 is otherwise a relatively air tight enclosure covered on the reverse side by a metal or plastic cover plate 22, FIG. 9, secured to the enclosure 2 as shown and under the area of the blade 11. The enclosure 2 is mounted on a support platform 23 which encloses electrical connections and any electrical components that control the drive motor for slicer blade 11. A power cord 25 and electrical plug 27 are shown where the power cord enters a storage compartment under the support platform. An overall stabilizing base 29 supports the slicer. The food to be sliced is mounted on food carriage 31 and pressed manually against the slicer blade 11 by food pusher 33. The thickness of food slices is controlled by means of thickness control knob 35, FIG. 8. A secondary exhaust port 13 as described later is located on the underside of enclosure 2. Air is free to exhaust from portal vent 13 into the inside of support platform 23 and to exit out of vents on the underside of the support platform 23 into the room. The thickness control plate 37 can be moved laterally by knob 35 to allow the thickness of the food slice to be increased or reduced.

Figure 1:
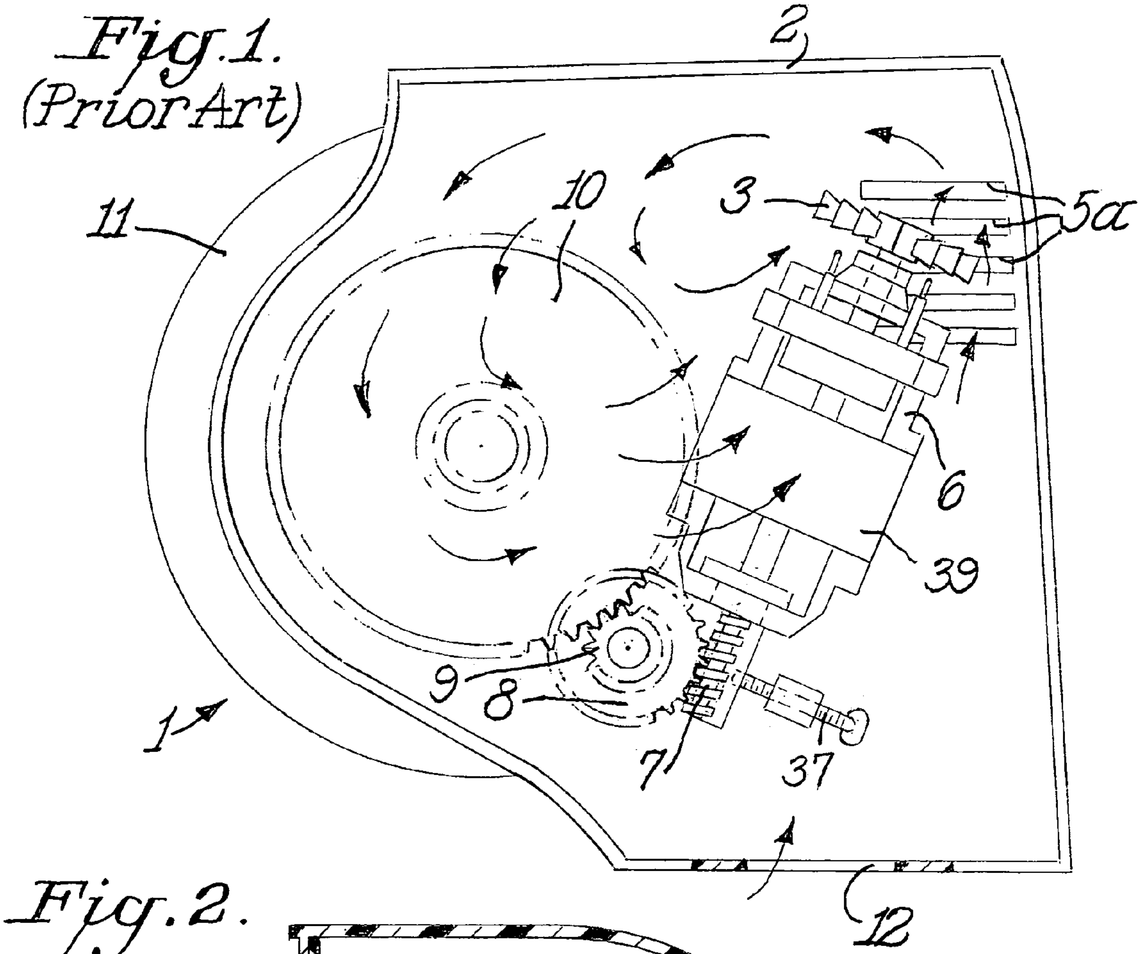
Fig.1. (Prior Art)
FIG. 1 illustrates a prior art conventional motor mounting for low cost household slicers.

FIG. 1 illustrates a conventional motor mounting typical of low cost household slicers. The motor is mounted in the relatively intuitive manner where the air is pulled upward by the fan and thermal convection as the air is heated by the hotter motor. Most of the heated air recirculates within the enclosure and becomes hotter as the motor continues to run. The temperature of the motor continues to climb steadily especially as the motor is put under load to power the slicer blade and to slice food. Only a small fraction of the heated air escapes to the exterior of the enclosure and very little cooler air comes into the motor enclosure to dilute the recirculating hotter air. This poor configuration ultimately limits the torque and power available from the motor and endangers the heated plastic drive gears as the slicer undertakes to slice significant quantities of food.

In this conventional configuration shown in FIG. 1, the motor 6 is typically mounted within enclosure 2 with the fan 3 mounted on the upper end of the shaft near the top of the enclosure. The fan typically has no shroud. The fan is driven by the motor shaft extension on which it is mounted. Air enters the enclosure 2 through an opening 12 often located at the bottom of the enclosure and circulates over the outside of the motor. The fan 3 is mounted perpendicular to the nominally planer surface of the enclosure wall in which ventilating slots 5*a* exist to allow air to exit the enclosure. The fan is sufficiently removed from the exit ports 5*a* that little air is exhausted. Most of the air driven by the fan simply recirculates within the enclosure and becomes hotter and hotter when the motor is on and especially when the motor is under a slicing load. In this prior art example, the metal worm gear 7 on the motor shaft drives plastic gear 8 which is coaxial with smaller plastic gear 9 which drives plastic gear 10 attached to the slicing blade 11 shown in phantom and causes, therefore, the blade to rotate. An adjustment screw 37 is commonly used to press the motor and its worm gear into sustained contact with plastic gear 8. The plastic gears 8, 9 and 10 will increase in temperature as the slicer is powered under load. The gear 8 is particularly vulnerable since it is heated both by its contact with the hot worm gear 7 and by elevated ambient air temperature. Thus, it is very important to keep the air temperature in the enclosure as low as possible.

In the conventional arrangement shown in FIG. 1, the inefficient fan arrangement does not create enough air pressure adjacent to either the exhaust ports 5*a* or near the intake hole 12 to either exhaust air efficiently or to create enough negative pressure at port 12 to ensure any exchange of the air inside the motor compartment. Hence the temperature within the enclosure 2 rises dramatically and the motor temperature ultimately exceeds the safe limits specified by the manufacturers of wire insulation and exceeds the limits established by the Underwriters Laboratories. These higher temperatures clearly set an upper limit on the torque deliverable by the motor and by the amount of work (slicing) that can be done by the motor before these limits are reached. It is common practice, therefore, for manufacturers of less expensive slicers to set limits on the length of time that slicers can be operated before they must be shut down and allowed to cool off. It is not uncommon for the slicer manufacturers to sell slicers with only momentary “ON” switches that must be held down manually in order to energize the motor. This clearly limits the usefulness of a slicer to the potential purchaser. This inventor has found that the novel cooling arrangements described in the following disclosure has virtually eliminated the need to set such limits on the operating time of the slicer. The unique cooling arrangement illustrated in FIG. 2 has been demonstrated to overcome the limitations described above and permits the motor of such slicers to operate virtually continuously under heavy duty slicing of even the most difficult to slice materials such as provolone cheese and hard salami. The novel cooling arrangement described here insures direct cooling with the cooler air received directly from the outside of the enclosure 2 by means of a conduit or by means of internal walls or compartments directly to the motor’s electrical windings and all gears and insures efficient removal of the hot air exiting from the motor windings directly to the outside of the enclosure without any opportunity for the heated air to recirculate within the motor compartment. In an example of this novel arrangement shown in FIG. 2, the air is moved downward in a counter-intuitive direction against the upward direction that heated air otherwise prefers to flow. This concept does, however, allow the motor axis to be in a horizontal plane or tilted to the horizon if that proves to be desirable for other reasons.

Figure 2:
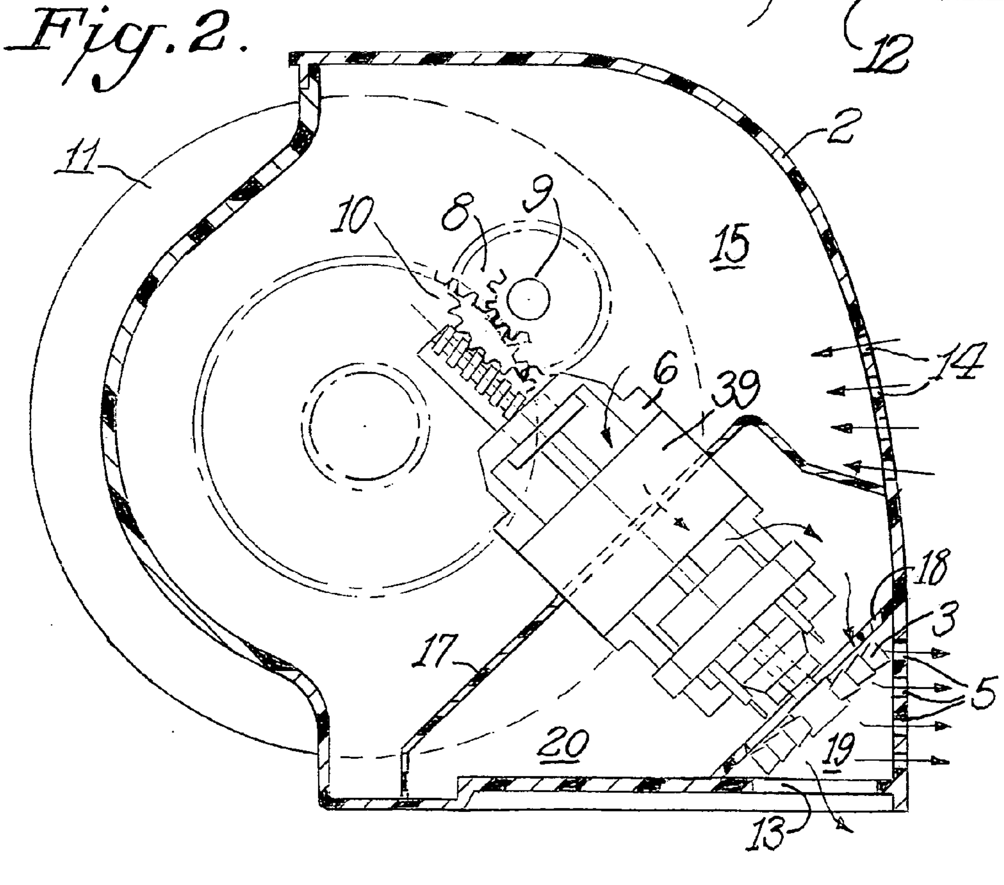
FIG. 2 is a view similar to FIG. 1 illustrating cooling arrangement for an efficient food slicer in accordance with this invention.
Figure 3:
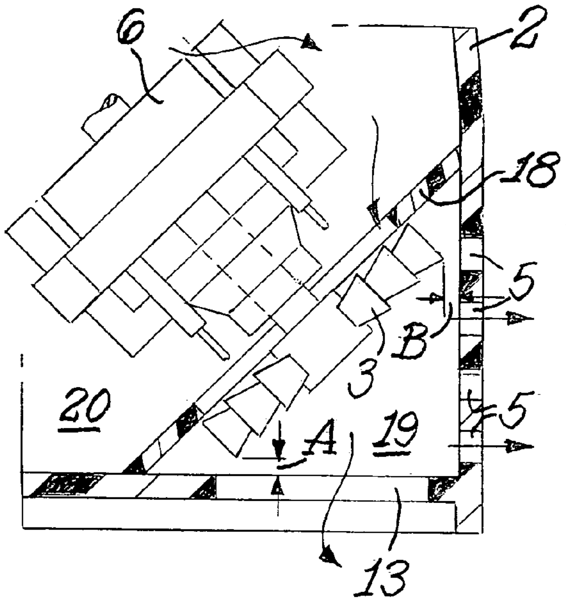
FIG. 3 illustrates a portion of a housing for the cooling arrangement of this invention.

In FIG. 2, the motor 6 is mounted such that the fan 3 on the motor shaft is mounted in a corner of the motor enclosure 2 such that air exiting from the fan is exhausted directly through portal vents 5 and vent 13 of FIG. 3 to the exterior of the enclosure. At the rear face of the fan blade, 3 is a circular close fitting aperture in partition 18. As seen in FIGS. 2 and 3, the aperture is shown as a half ring. The upper mating half of the circular aperture around the rear of the fan is incorporated inside as part of the enclosure cover, 22 of FIG. 9 to form an otherwise air tight partition 18 adjacent to or around the fan blade. The aperture can be located on the intake side of the fan and be smaller than the fan diameter, but any reduction in its area will obviously reduce the effectiveness of the fan. The fan must be located as close as possible physically to the aperture. Air is free to pass by action of the fan through the circular aperture but it cannot return around the fan to the motor compartment 20 because the partition 18 extends to the walls of the enclosure 2, along those walls and to the top and across the cover plate 22 FIG. 9, to the opposite wall of the enclosure.

Figure 5:
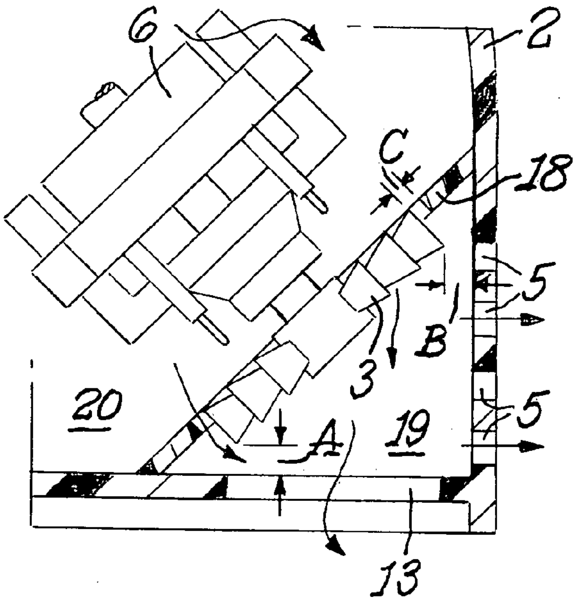
FIG. 5 is a view similar to FIG. 3 illustrating operation of the cooling arrangement.

The aperture in partition 18 must be close to but not contact the fan blade. If the aperture is larger than the fan, it must conform closely to the circumference of the fan blades with a tolerance C, FIG. 5, which should be as small as practical and not more than about 2 mm. The fan blades should also be as close as possible, A and B, to the exterior portal vents 5 and 13 in the walls of the enclosure 2, but always within 1 cm at the point nearest the blade to achieve an optimum benefit. Fans such as shown even with contoured blades are relatively inefficient and do not develop a high pressure drop across the fan. They are relatively efficient at slinging the air out laterally from the fan with good velocity and, hence, a corner configuration such as shown in FIG. 2 is favorable for such fans allowing the air to be thrown out of vents 5 and 13 promptly. The vents, however, must be adequate in size to minimize unit back pressure as the air passes through them. Each aperture should optimally have minimum opening dimensions of about 1 centimeter but not less than about 4 mm to optimize the prompt exhausting of the heated air.

The circular closely conforming aperture in partition 18 adjacent to the face of the fan or its circumference is preferable relatively thin, but it can be cylindrical and around the fan blade if it contains openings adjacent to the portal vents to allow more efficient and prompt exhausting of the heated air. If a cylindrical shroud is used and it is too long, compression effects are created along the cylindrical walls that cause a fraction of the heated air to recirculate back along the central axis of the fan into the motor compartment. When cylindrical shrouds are used around the fan, the fan must be located near the air entrance side of the shroud.

An otherwise air tight enclosing wall 17, FIG. 2, surrounds the central physical structure 39 of the motor body or frame so that air pulled through internal openings in the motor must come only from that sectioned compartment 15 of the enclosure 2 which can receive air only from the outside through intake portal vents 14 located along a portion of the exterior wall of enclosure 2 that defines chamber 15. In this manner, only cool ambient air is pulled into chamber 15. Heated air exhausting from the motor passes into chamber 20 and exhausts only through the fan 3 and then into the small corner compartment 19 and out to the environment through portal vents 5 and 13. The portal vents can be a single large opening such as vent 13 or a series of slots like vents 5 of sufficient size to avoid development of back pressure in the corner compartment 19.

Hence, the cooler outside air enters compartment 15. Air from compartment 15 will pass through openings at the front (top as shown) of the motor 6 and more specifically within the enclosed motor frame 39 but not around the outside of that motor frame. Ideally, the motor frame is cylindrical in shape, but in any case it surrounds the internal armature and any stator windings such that air can be confined within the frame as the air passing into one end of the frame passes in intimate contact with the internal windings and exits the other end of the frame. The frame can be of any shape so long as it serves this function. A structure of this sort can be fabricated to closely surround motors that have an open frame structure to accomplish the same end. The air circulating inside the motor makes intimate contact with the motor windings and the inside components of the motor enclosure thus cooling the windings very effectively. The windings are the hottest components in the motor and by passing the cooler air from compartment 15 directly over the hot windings, the cooling is particularly efficient. The large temperature differential between the hot windings and the higher velocity cool air maximizes the heat transfer to the air.

Air exiting the motor frame into compartment 20 is exhausted efficiently by the fan to compartment 19 which has portal vents sufficiently large in dimensions and in overall area to allow the air to pass promptly to the exterior of the slicer into room environment. The intake ports 14 must likewise be of sufficient individual dimension and total area to avoid developing a significant pressure drop however small across those ports as the ambient air enters chamber 15.

By having only cooler ambient air in chamber 15 where the plastic gears are mounted aids substantially in keeping those gears cooler thus avoiding any compromise of their physical strength due to exhaust heat from the hottest part of the motor.

Figure 4:
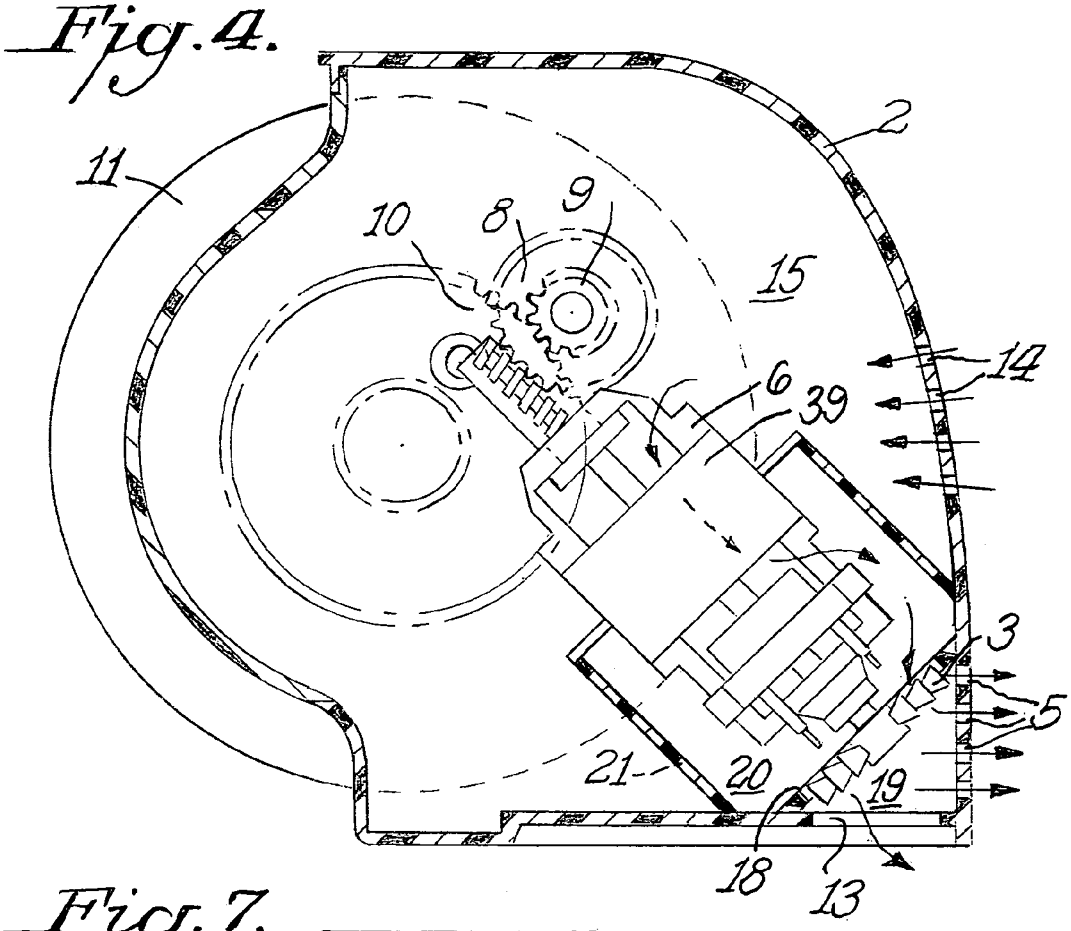
FIG. 4 is a view similar to FIG. 2 of an alternative embodiment of this invention.

FIG. 4 is an alternative configuration of a walled compartment enclosure similar to that of FIG. 2, but different in that the partition wall 17 of FIG. 2 is modified and shown as partition wall 21. In FIG. 2 that partition wall 17 connects first to the side walls of enclosure 2 that, in turn, connects to the partition wall 18 which has a circular aperture that conforms closely to the face or circumference of fan 3. In FIG. 4 the partition walls attach to the enclosure 2 very close to the partition wall 18 and hence enclosure 20 is smaller. In either of these examples of compartmental arrangements within enclosure 2, the outside air is pulled through the portal vents 14 into compartment 15 of enclosure 2, then the air is pulled through the interior of the enclosed frame 39 that surrounds the armature and stator of motor 6 so that the air is forced to flow in intimate contact with the electrical windings and other heated motor components and then into compartment 20. The heated air is exhausted from motor compartment 20 by fan 3 into compartment 19 where it is exhausted promptly through the exhaust portal vents 5 and 13. These portal openings can be large or, in any event, large enough in area to permit the exhaust air to exit with little to no resistance or development of significant back pressure to resist the direct exiting of the air.

The partitioning wall 21, FIG. 4, can be a structural wall, either attached—in part to the walls of enclosure 2 or it can be a semi-separate enclosure wall as of a cylindrical shape surrounding the motor, sealing the motor frame 39 to prevent air flow around that enclosing frame 39. In any event the wall of compartment 20 must fit air tight to the wall of enclosure 2 or to partition 18 that contains the closely fitting fan aperture. The compartment 20 must, in either example, be nominally air tight in order that air can enter or leave only through the interior passages of the motor or the fan aperture. For optimum cooling of the motor and the drive gears such as 8, 9 and 10, the air must enter through portal openings 14, pass through the motor and fan and then exit through the portal openings 5 and 13.

Figure 6:
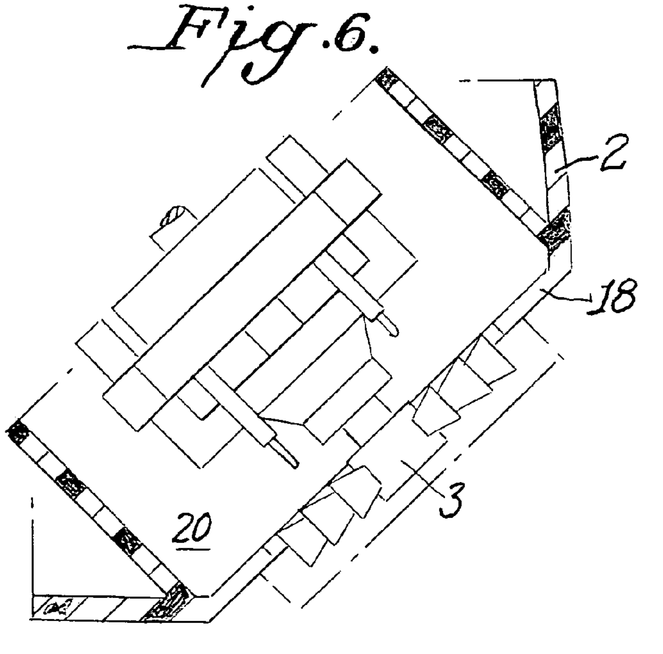
FIGS. 6–7 illustrate various practices of this invention.
Figure 7:
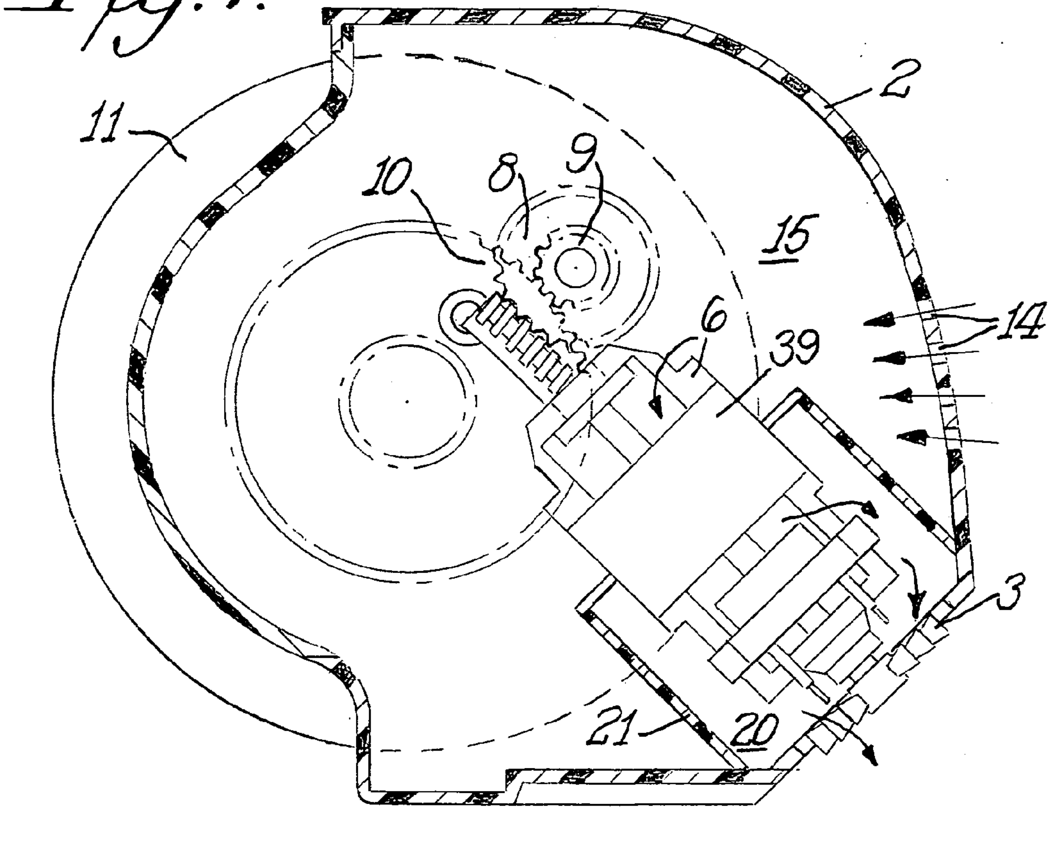

Most inexpensive fans commonly made of molded plastic have been found by this inventor to be highly inefficient in directing the air axially. By their design, such fans impact the air and move it centrifugally in directions largely in the range of 20 to 90° from the rotational axis of the fan. If the air so moved by the fan is confined rigorously by a confining cylindrical structure closely fitting to the fan circumference in the axial direction, enough air pressure can develop along the walls of such confining structure to redirect some air flow backward along the axis of the fan into the compartment that one is attempting to exhaust. Such backward flow is, of course, counterproductive and leads to recirculating some of the heated air and is to be avoided. Regardless of the fan design and its adjacent aperture, the air should not be allowed to recirculate into compartment 20. Likewise, it is preferable to minimize any tendency of the air to recirculate within compartment 19. Instead, the heated air should be exhausted promptly to the exterior of the enclosure 2. Hence, the portal vents must be in close proximity to the fan circumference. Any physical obstructions in the vicinity of the fan perimeter other than a relatively thin partitioning aperture 18 on the air entrance side of the fan are generally to be avoided. The physical arrangement of FIGS. 2, 3 and 4 shows multiple vent openings 5 and 13 as part of the exhaust port construction. The total area of all vents constituting the exit port should be of approximately the same area as or a larger area than the planar area of the fan and its confining aperture. Each of the openings in the portal vents should have a minimal dimension as large as possible consistent with safety considerations aimed at preventing personal physical contact with the revolving fan. Except for safety and appearance considerations, ideally, the fan aperture will be located on the exterior wall of enclosure 2 exhausting to the environment thereby eliminating chamber 19 as shown in FIGS. 6 and 7; however, any such arrangement has the serious safety disadvantage and the risk of liquids or small debris inadvertently entering the openings. An arrangement similar to FIGS. 6 and 7 becomes practical if the air can exit from the fan 3 into a larger dimensional enclosed space such as an electronic compartment in the slicer or a supporting enclosure 23 in the slicer FIGS. 8, 9 and 10 under the base of the motor containing enclosure 2.

The physical arrangement of the exit port shown in FIG. 2 employing a triangular corner configuration of the portal vents 5 and 13 in two short perpendicular walls located immediately in front of the fan is one preferred arrangement that allows the heated air to exit at high velocity out vents 5 to the outside environment and out of vents 13 located adjacent to the open base of the slicer where it can pass through and exhaust freely to the environment. Many other physical arrangements of the outer walls and vents of compartment 19 are possible. For example, the exterior walls could conform approximately to a hemispherical dome shape with an adequate number of vents therein to permit the exhaust air to exit freely. Similarly, an open weave screen-like cover can be used. In any event, the total area of openings for the exiting of the air should be approximately equal to or larger than the projected planer area of the fan aperture and the smallest size of any dimension of individual portal vents should be about 4–5 mm in order to minimize resistance to the air flow. Smaller dimensions will decrease somewhat the efficiency of air flow out of the openings.

In the triangular corner configuration of the walls in front of the fan, the compartment should preferably be small and its walls and vents should be in close proximity to the circumference of the fan blades. It is desirable that the air impact the vents at a high velocity to optimize the exhausting action and to minimize recirculation of the air with the compartment 19. The dimensions A and B of FIG. 3 which are the distances from the nearest perimeter corner of the fan blade to the nearest portal vent should be as small as practical but not greater than one (1) centimeter, respectively, in order to optimize air flow out of the compartment and to reduce recirculation. Safety regulations set by regulatory agencies restrict these distances and portal vent opening sizes to an angular relationship dictated by the shape of a physical probe that must not touch moving components.

Figure 11:
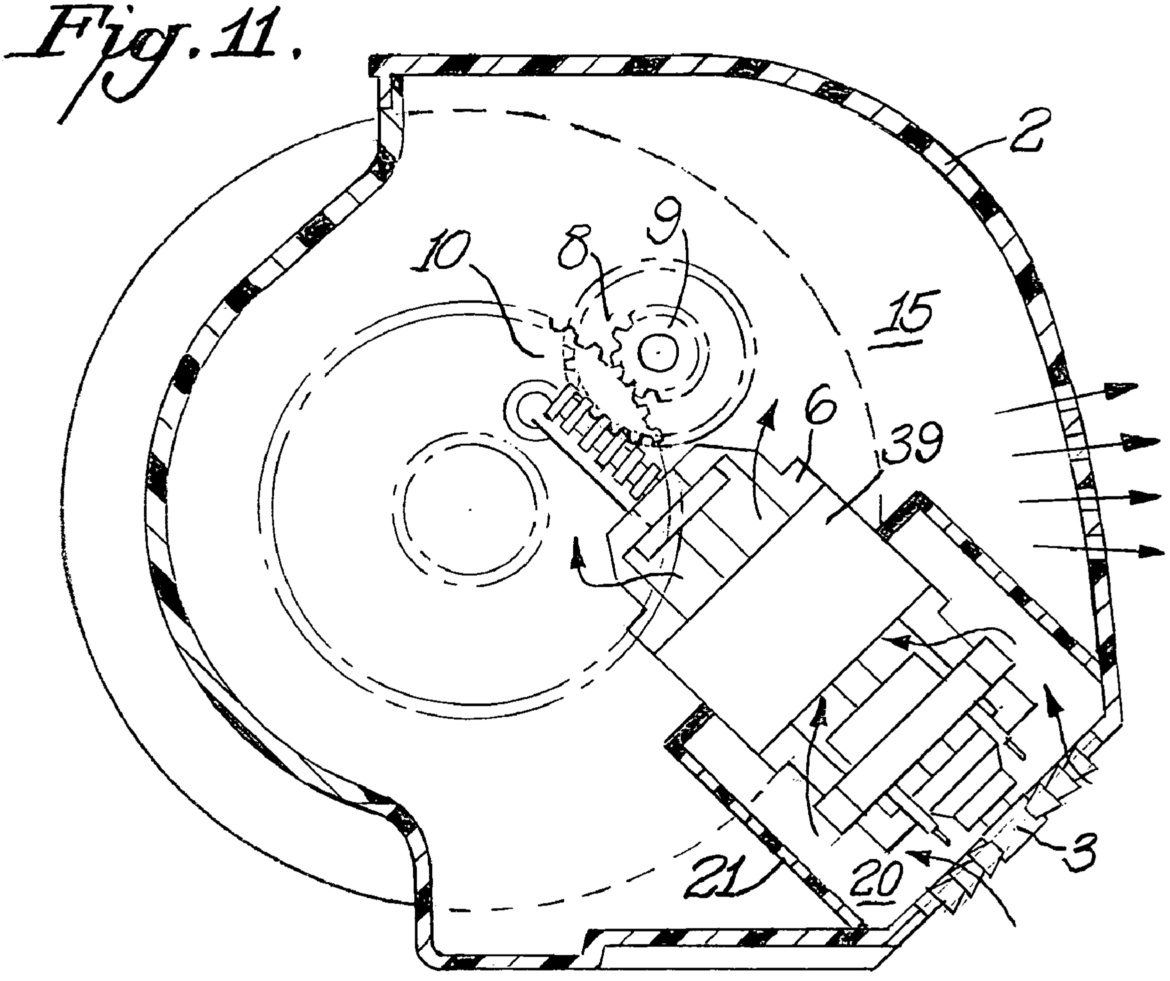
FIG. 11 is a view similar to FIGS. 2, 4 and 7 of an alternative cooling arrangement in accordance with this invention.

An alternative cooling arrangement is shown in FIG. 11. There the air flow is reversed so that outside air is drawn into the inner chamber 20 by fan 3 directly from the exterior of enclosure 2. The air flows through chamber 20, then inside the motor frame and then exits into enclosure 15 and exhausts through ports 14 to the outside. This is more efficient than the conventional arrangement of FIG. 1 in bringing the outside air into contact with the motor windings, but the heat from the motor exits from the gear compartment 15 raising its air temperature significantly. This arrangement is less efficient than those in FIGS. 2 and 7, for example.

In summary, a superior, more efficient cooling system for the motor and drive gears of inexpensive food slicers has been developed that insures the flow of cooler ambient air around the drive gears, moves cooler ambient air directly inside the motor frame into direct higher velocity contact with the hottest components in the motor—namely, the electrical windings of the armature and stator and exhausts efficiently the air that has been heated by such components through means of an inexpensive fan to outside of the motor and gear enclosure with little to no recirculation of the heated air to the drive gear or the motor interior components. This is accomplished by creating a physical walled compartment that surrounds much of the motor sealing tightly around the motor frame or shell and providing aperture in the wall of that enclosure immediately adjacent a fan mounted on the motor shaft to draw the ambient air around the drive gears and into and through the interior of the motor and out through the fan aperture directly to the outside of the enclosure or into a second small compartment that is vented to the outside and otherwise sealed off, except for the fan aperture, from the motor and the gears so as to prevent recirculation of the heated air through the motor or around the drive gears.

Extensive temperature measurements were made and foods were sliced with slicers constructed with the conventional motor, gear and fan arrangement of FIG. 1 and with the improved arrangements of these components as in FIGS. 2 and 4 with an isolated motor compartment and an isolated fan compartment as shown. Major improvements in performance were realized.

It was demonstrated for example, that the temperature of the electrical windings of the d.c. motor operating for 20 minutes under no load (not cutting food) in the conventional non-compartmental arrangement of FIG. 1 reached equilibrium in twenty minutes at 198° F. while with the compartmental arrangement of FIG. 4 in the same time period the temperature of the windings reached equilibrium at only 104° F. an important difference and major improvement of 94° F.

Tests under a constant simulated slicing load showed that a slicer with the compartmented design of FIG. 2 could sustain a load of 2.84 foot pounds for 20 minutes compared to a load of only 1.04 foot pounds for 20 minutes with the same motor mounted conventionally in a non-compartmented arrangement (FIG. 1). In each case the winding temperature during the test was arbitrarily limited to 229° F., a safe winding temperature.

Comparison tests made of the conventionally non-compartmented motor/fan arrangement with the improved compartmented design of FIG. 2 using the same motor showed repeatedly that the compartmented design could operate with constant simulated cutting loads that were a minimum of 1.5 times larger to a maximum of about 2.5 times larger that the conventional non-compartmented design.

Further it was demonstrated that with the compartmented design of FIG. 2 the slicer could cut the more difficult foods such as provolone cheese and hard salami indefinitely without overheating the inexpensive drive motor. This is in sharp contrast to the maximum cutting time of 10 minutes commonly recommended by the manufacturers of conventional slicers with conventionally cooled motors of the same wattage, design and construction.

What is claimed is:

1. A food slicer comprising a food sliding carriage, an electrically powered motor rotating a cooling fan and having a power train for driving a slicing blade, said motor and said power train being mounted within an enclosure, said blade being mounted at the exterior of said enclosure, said motor having a frame which houses electrical windings, said motor frame extending through an aperture in a first partitioning wall, said motor frame contacting said first partitioning wall at said aperture to be sealingly mounted to said first partitioning wall, said fan being mounted immediately adjacent to a non-contacting aperture in a second partitioning wall within said enclosure to create an air discharge compartment in which said fan is located on a side of said second partitioning wall remote from said first partitioning wall, said enclosure having at least one intake port, at least one exhaust port in said enclosure at said air discharge compartment, an air flow path being created by cooling air entering said enclosure through said at least one intake port to pass around and cool said power train on one side of said first partitioning wall and the air then moving into intimate contact with said electrical windings within said frame and the air is then directed through said aperture of said second partitioning wall by being drawn inwardly by said fan and the air then being exhausted directly from said enclosure through said at least one exhaust port without any interference from any intermediate structure between said fan and said at least one exhaust port so that the air flows from said fan directly out of said enclosure, and the discharge area of said at least one exhaust port being sufficiently large to permit the exhausting air to exit said enclosure without development of significant back pressure to resist the direct exiting of the air.

2. A food slicer according to claim 1 where the perimeter of said cooling fan is in close proximity to, but out of contact with vents of said at least one exhaust port within said air discharge compartment.

3. A food slicer according to claim 1 where said at least one exhaust port comprises multiple vents which have a total open exhaust area not less than the planer circular area of said fan aperture.

4. A food slicer according to claim 1 where said at least one exhaust port comprises a plurality of vents, and the smallest dimension of the opening of any of said vents is greater than about 4 millimeters.

5. A food slicer according to claim 1 where the opening of said aperture adjacent said fan is slightly smaller than the diameter of said fan.

6. A food slicer according to claim 1 where said at least one exhaust port consists of multiple vents, the closest of said vents being within one centimeter of said fan.

7. A food slicer according to claim 1 where the opening of said aperture in said second partitioning wall adjacent said fan is larger than said fan but larger by less than 4 millimeters.

8. A food slicer according to claim 1 where said fan is mounted directly on the drive shaft of said motor.

9. A food slicer according to claim 1 where said first partitioning wall creates a sealed portion of said enclosure comprising an interior compartment into which said motor frame extends and comprising said air discharge compartment separated from said interior compartment by said second partitioning wall.

10. A food slicer according to claim 1 where said air discharge compartment is of generally triangular cross section formed by said second partitioning wall and by abutting walls of said enclosure at a corner of said enclosure.

11. A food slicer according to claim 1 where said blade is a generally flat circular blade which is rotated by said power train.

12. A food slicer according to claim 1 where said first partitioning wall is located above said second partitioning wall, said at least one exhaust port being at the bottom of said enclosure, and the flow of air through said enclosure being in a downward direction.

* * * * *